United States Patent [19]

Lievsay, Jr.

[11] Patent Number: 4,658,317
[45] Date of Patent: Apr. 14, 1987

[54] FLEXIBLE MAGNETIC DISK WRITE PROTECT DEVICE

[76] Inventor: Claude Lievsay, Jr., 2435 Villanueva Way, Mountain View, Calif. 94040

[21] Appl. No.: 638,877

[22] Filed: Aug. 7, 1984

[51] Int. Cl.⁴ ..................... G11B 23/03; G11B 15/04; G11B 19/04
[52] U.S. Cl. ...................................... 360/133; 360/60
[58] Field of Search .................. 360/132, 133, 137, 60

[56] References Cited

U.S. PATENT DOCUMENTS

| | | | |
|---|---|---|---|
| 4,521,820 | 7/1985 | Fann | 360/133 |
| 4,536,812 | 8/1985 | Oishi et al. | 360/133 |
| 4,549,240 | 10/1985 | Hodges | 360/133 |

OTHER PUBLICATIONS

Gilligan, D. W.,; "Reusable Write Protect Tab for Floppy Disk", I.B.M. Technical Disclosure Bulletin; vol. 26, No. 12, May 1984, pp. 6427-6428.

*Primary Examiner*—A. J. Heinz
*Assistant Examiner*—Melissa J. Koval
*Attorney, Agent, or Firm*—Donald C. Feix

[57] ABSTRACT

A device to disable the write enable system of flexible magnetic disk drives. By closing the notch normally provided in the edge of a standard flexible magnetic disk jacket, an engagement pin configured to take advantage of the construction and physical characteristics of the flexible magnetic disk jacket is inserted into the jacket notch thereby preventing the activation of the write enable function of the flexible magnetic disk drive and providing a visual indicator to the operator that the disk installed and operating in the disk drive is write protected.

3 Claims, 3 Drawing Figures

FLEXIBLE MAGNETIC DISK WRITE PROTECT DEVICE

BACKGROUND OF THE INVENTION

The invention relates to flexible magnetic disks and more particularly to the standard write enable notch found on the jacket edge of these flexible magnetic disk assemblies.

The flexible magnetic disk popularly known as a "Diskette" or "Floppy" disk, has become the most popular means of storing, in binary form, files used with word processors and personal computers. A necessary feature of the floppy disk drives used to read and write the binary information on the flexible magnetic disk is that of providing a means of protecting data resident on a disk from accidental erasure or re-recording.

The accepted method for accomplishing this write protection is for the manufacturers of the flexible magnetic disks to provide a specifically located and dimensioned notch on the edge of the jacket enclosing the magnetic disk, and the manufacturers of the magnetic disk drives provide a means of sensing the presence of this notch before enabling the erase or record functions.

The most popular method used by the disk drive manufacturers to accomplish notch sensing is by use of a microswitch and arm as described and shown in FIG. 2 of U.S. Pat. No. 4,040,106 entitled "Flexible Magnetic Disc Drive Apparatus", by Harold C. Medley, although other sense techniques such as light sensing are currently in use.

To preclude the inadvertent loss of recorded data, operators of systems utilizing flexible magnetic disks cover the notch with an adhesive tape. When operators wish to add new data to the magnetic disk or alter or remove existing recorded data they must peel off this adhesive tape before their system will enable the erase or write functions.

The typical operator performs this application and removal of adhesive tape many times on their Floppy disks and as a result the adhesive makes a sticky mess on the jacket of the disk or depending upon temperature, time, humidity and other environmental factors, the adhesive either sticks so tenaciously it is difficult to remove the tape or sticks so poorly that the tape falls off.

SUMMARY OF INVENTION

The object of the present invention is to provide a more satisfactory solution to users of word processors and personal computers who must maintain write protection on their data disks and periodically are required to alter, erase or add data to the flexible magnetic disk. In the preferred form of the invention, a pin is configured such that when it is inserted into the notch in the edge of the flexible magnetic disk jacket, the head of the pin completely fills the notch thereby effectively disabling the erase and write functions of all flexible magnetic disk drives that detect, by whatever means, an open notch before their erase or write functions are enabled.

The write protect pin can be easily inserted and withdrawn and has a life dependent mostly upon the properties of the material from which it is made. A variety of materials and fabrication techniques may be used to accomplish the configuration required, however, magnetic materials should be avoided.

The configuration of the write protect pin can be likened to a miniature carving knife in that the head of the write protect pin would be analogous to the handle of the knife and the blade of the write protect pin analogous to the blade of the knife. The blade of the write protect pin is inserted into the jacket at the small side of the rectangular write enable notch most distant from the center of the magnetic disk. The orientation of the write protect pin is such that the longest edge of the blade is parallel and adjacent to the inside edge of the jacket. The pin is inserted until the head of the pin snaps into the notch and the point of the pin just protrudes through the corner hole of the jacket sufficient to serve as a visual indicator to the operator that the disk in the disk drive is Write Protected.

DESCRIPTION OF THE PREFERRED EMBODIMENT

Figure 1:
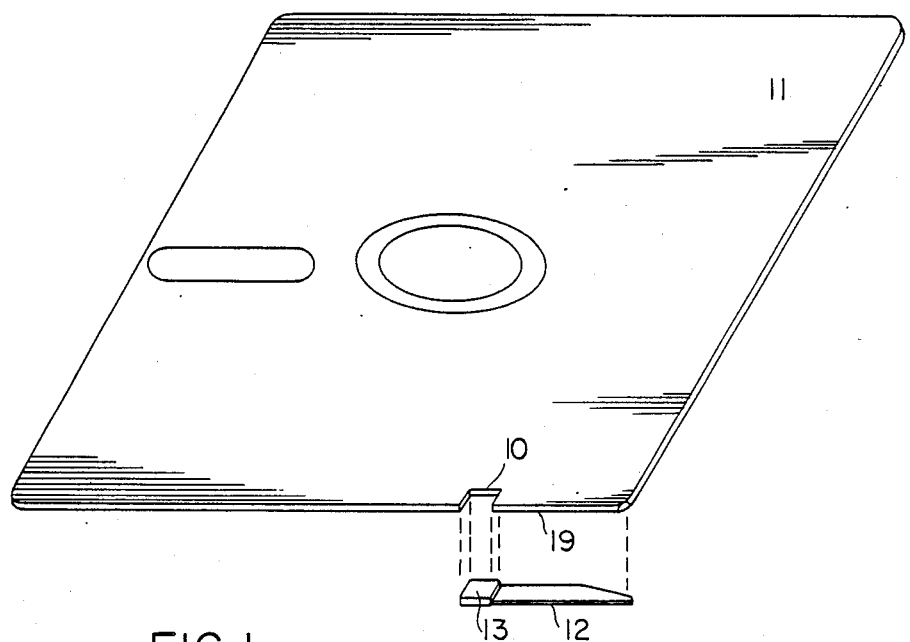
FIG. 1 shows a Flexible Magnetic disk with a Write Protect Pin displaced vertically below the Write Enable Notch.
Figure 2:
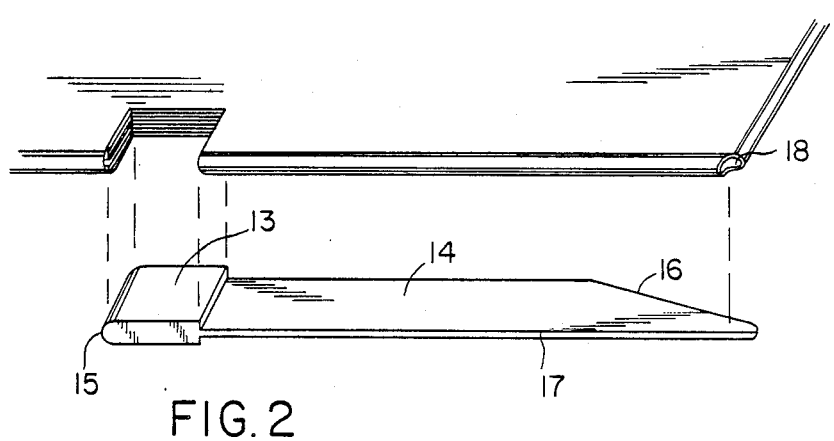
FIG. 2 is Detail 2 of FIG. 1 and shows a close-up view of the Write Enable Notch and Write Protect Pin.
Figure 3:
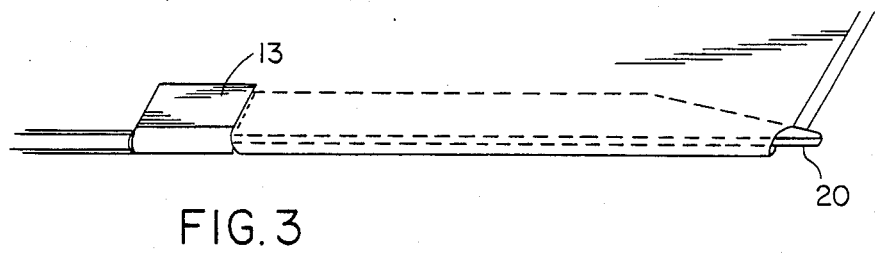
FIG. 3 shows the Write Protect Pin installed into the notch with dotted lines indicating the shape and position of the pin within the envelope of the Flexible Magnetic Disk.

As previously pointed out, commercially available Flexible Magnetic Disks have a notch 10 precisely located in one edge of the disk envelope 11 so that devices embodied in disk drives can detect the presence of said notch before enabling write or erase functions.

The invention disclosed here is a non-magnetic pin 12 designed to prevent notch detection by the techniques currently employed by popular Flexible Magnetic Disk drives.

In the preferred embodiment the head 13 of the Write Protect Pin completely fills the volume of the notch; that is to say the thickness, length and width of the notch are duplicated as head dimensions for the pin (The standard notch size for the 5.25 inch floppy disk is 0.250 inches along the edge of the jacket and 0.140 inches wide).

The width of the blade 14 of the Write Protect pin is a continuation of the notch width as is the pin head 13 described above. The length of the long edge 17 of the pin is sufficient to just exit the tip 20 at, the construction joint hole 18 at the corner of the disk envelope 11 (The standard dimension for this short element 19 of the edge of the jacket is 1.20 inches for the 5.25 inch floppy disk). The protrusion of the tip 20 of the pin through the corner hole provides the operator a visual indication that a diskette installed and operating in a drive is Write Protected.

The thickness of the blade 14 is not critical except that it should not exceed about one third of the thickness of the head 13.

The point of the blade is established by the intersection of the long edge 17 and the biased edge 16. The length of the biased edge is approximately one and a half times the width of the blade. It is not desirable that the point of the blade be sharp, so in order to preclude injury to the fingers of the operator the point should be blunted by a radius of approximately 0.020 inches. In order to take proper advantage of the protruding pin tip as a visual indicator of write protection, it should be of a color in high contrast with the jacket of the magnetic disk. The radius is desirable, but not necessary.

To install the head 13 in the notch 10, the point of the blade 14 is inserted into the jacket at the small side of the rectangular write enable notch which is most distant from the center of the magnetic disc. That is, the rounded point of the blade is inserted into the notch and into the space between the top and bottom walls of the jacket; and the pin is then pushed forward until the rounded end of the blade 14 projects from the corner hole 18 at the corner of the jacket. In this position the head 13 fits within the notch 10, and the curved surface 15 engages the side of the notch which is most distant from the corner hole 18 so as to retain the pin 12 in place.

For disk drives utilizing the notch sensor type described in reference U.S. Pat. No. 4,040,106, the pin configuration just described will prevent the notch sensor from detecting the notch and thereby inhibit the write or erase enable function of the drive.

For disk drives utilizing light-beam detection, it is necessary to completely close the Write Enable notch, and the head 13 does this by completely filling the volume of the slot. Whereas this invention is herein described in the preferred configuration, it should be realized that various changes may be made without departing from essential contributions to the art made by the teachings hereof.

I claim:

1. A method of write protecting a flexible magnetic disk assembly of a kind in which a rectangular shaped jacket has top and bottom walls enclosing a magnetic disk and has a rectangular shaped write enable notch in one edge of the jacket, said method comprising, positioning a non-magnetic pin having a head and a blade in the jacket by first inserting a tip of the blade into the jacket at the side of the notch which is most distant from the center of the magnetic disk and into the space between the top and bottom walls of the jacket and then progressively moving the tip of the blade toward a adjoining corner of the jacket until the head fits within the notch, and wherein said head has a thickness, length, and width matched to the respective thickness, length and width of the write enable notch so that said head completely fills the volume of the notch to thereby prevent both mechanical microswitch sensing and light sensing of the notch by an erase and record mechanism of an apparatus with which the disk is used, and wherein said blade is joined to the head at the base of the blade and has a biased edge at the end of the blade, a long outside edge, said tip formed at the intersection of the long edge and the biased edge, and a length of the long edge which is matched to the distance from said jacket corner to said side of the notch in which the tip is first inserted so as to cause said tip to engage said corner and to retain said pin in place in the jacket when said head fits within the notch.

2. A write protected flexible magnetic disk assembly comprising, a magnetic disk, a rectangular shaped jacket having top and bottom walls enclosing the disk, a rectangular shaped write enable notch in one edge of the jacket, a non-magnetic pin having a head in the notch and a blade extending from the notch and between the top and bottom walls to a corner of the jacket, said head having a thickness, length, and width matched to the respective thickness, length and width of the write enable notch so that said head completely fills the volume of the notch to thereby prevent both mechanical microswitch sensing and light sensing of the notch by an erase and record mechanism of an apparatus with which the disk is used, said blade being joined to the head at the base of the blade and having a biased edge at the end of the blade, a long outside edge, a tip at the intersection of the long edge and the biased edge, and a width and a thickness which enable the tip of the blade to be inserted into the jacket at the side of the rectangular write enable notch which is most distant from the center of the magnetic disk and into the space between the top and bottom walls of the jacket and then progressively moved toward the adjoining corner of the jacket until said head fits within the notch, and wherein the length of the long outside edge is matched to the distance from said jacket corner to said side of the notch in which the tip is first inserted so as to cause said tip to engage said corner and to retain said pin in place in the jacket when said head fits within the notch.

3. A write protection mechanism for completely filling a write enable notch on a jacket edge of a flexible magnetic disk assembly to protect data resident on the disc from accidental erasure or re-recording by preventing both mechanical microswitch sensing and light sensing of the notch by an erase and record mechanism of an apparatus with which the disc is used, said write protection mechanism comprising, a non-magnetic pin having a head and a blade, said head having a thickness, length, and width matched to the respective thickness, length and width of the write enable notch of the related jacket edge of a flexible magnetic disk assembly with which the write protection mechanism is to be used so that said head completely fills the volume of said notch when the pin is installed in said jacket edge to thereby prevent both mechanical microswitch sensing and light sensing of the notch by the erase and record mechanism of the apparatus with which the disk is used, said blade being joined to the head at the base of the blade and having a biased edge at the end of the blade, a long outside edge, a tip at the intersection of the long edge and the biased edge, and a width and a thickness which enable the tip of the blade to be inserted into the jacket at the side of the rectangular write enable notch which is most distant from the center of the magnetic disk and into the space between the top and bottom walls of the jacket and then progressively moved toward the adjoining corner of the jacket until said head fits within the notch, and wherein the length of the long outside edge is matched to the distance from said jacket corner to said side of the notch in which the tip is first inserted so as to cause said tip to engage said corner and to retain said pin in place in the jacket when said head fits within the notch.

* * * * *